US006502468B1

United States Patent
Thornborough (12) United States Patent
(10) Patent No.: US 6,502,468 B1
(45) Date of Patent: Jan. 7, 2003

(54) METERING PULSE TRANSDUCER

(75) Inventor: Ray J. Thornborough, Menomonee Falls, WI (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 09/472,105

(22) Filed: Dec. 27, 1999

(51) Int. Cl.[7] .............................................. G01E 15/06
(52) U.S. Cl. ................................................. 73/861.78
(58) Field of Search ...................... 73/861.78; 307/106; 310/181, 68 B (56) References Cited

U.S. PATENT DOCUMENTS

| | | | |
|---|---|---|---|
| 3,238,776 A | * | 3/1966 | Potter ........................ 384/397 |
| 3,623,835 A | * | 11/1971 | Boyd ........................ 310/90.5 |
| 3,780,313 A | | 12/1973 | Wiegand |
| 4,200,785 A | * | 4/1980 | Evans et al. .................. 377/21 |
| 4,247,601 A | * | 1/1981 | Wiegand .................... 148/121 |
| 4,265,127 A | | 5/1981 | Onoda |
| 4,319,151 A | | 3/1982 | Klotz |
| 4,398,773 A | * | 8/1983 | Boden et al. .............. 310/90.5 |
| 4,579,008 A | | 4/1986 | Böhm et al. |
| 4,676,662 A | * | 6/1987 | Sekido ........................ 368/205 |
| 4,721,864 A | * | 1/1988 | Goosens .................... 307/106 |
| 4,793,192 A | * | 12/1988 | Jerger et al. ............. 73/861.78 |
| 4,868,566 A | | 9/1989 | Strobel et al. |
| 5,311,581 A | | 5/1994 | Merriam et al. |
| 5,372,048 A | * | 12/1994 | Dunbar .................... 73/861.89 |
| 5,659,290 A | * | 8/1997 | Haeri ........................ 340/439 |
| 5,707,753 A | * | 1/1998 | Kurhara et al. ............. 428/375 |
| 5,876,610 A | * | 3/1999 | Clack et al. ................ 210/282 |

FOREIGN PATENT DOCUMENTS

GB     2102129 A     1/1983

OTHER PUBLICATIONS

Gevatter et al.: Der Wiegand–Draht, ein neuer magnetischer Sensor Regelungstechnische Praxis, vol. 22, No. 3, Mar. 1980. (Translation in English is also provided.)

* cited by examiner

Primary Examiner—Benjamin R. Fuller
Assistant Examiner—Lilybett Martir
(74) Attorney, Agent, or Firm—Quarles & Brady LLP (57) ABSTRACT

A metering pulse transducer for utility meters, including meters for water, gas and electric service, includes a rotor (20) with five magnetically switchable elements (22–26) spaced around the axis of rotation (21), a sensing coil (27) disposed around the rotor (20), and two permanent magnets (29, 30) disposed diametrically across the rotor (20) and positioned with equal and opposite polarity such that their magnetic fields (51, 52) extend laterally to reach the path of travel (53) of the magnetically switchable elements (22–26), such that when the rotor is rotated, electric pulses are generated as a result of the magnetically switchable elements (22–26) passing the permanent magnets (29, 30). A rotor (20) having five switchable magnetic elements (22–26) disposed seventy-two degrees (72°) apart generates ten pulses per revolution of the rotor (20). The rotor (20) can be used to directly drive a "least significant digit" analog meter dial, or it may be connected to a meter register drive train (36, 37), or may be used in a turbine-type meter (70).

15 Claims, 7 Drawing Sheets

METERING PULSE TRANSDUCER

TECHNICAL FIELD

The present invention relates to utility meters, such as water meters or meters for gas or electric service. The invention more particularly relates to a transducer for converting mechanical movements, such as revolutions of a metering element to electrical pulses which can be conditioned to become digital signals.

DESCRIPTION OF THE BACKGROUND ART

An example of a prior metering pulse generator is illustrated and described in Strobel et al., U.S. Pat. No. 4,868,566, issued Sep. 19, 1989, and assigned to the assignee of the present invention. A piezoelectric material is arranged as a thin, elongated layer on a cantilevered spring member. A tooth on a rotating sprocket contacts an extended end of the spring member to produce a bending movement, which is then followed by a rapid return movement. This generates a pulse signal which is amplified by an amplifier positioned on the spring member.

In this prior construction, the spring member provided a load on the torque of the meter mechanism. This can have an effect on accuracy of the meter at the low end of the flow measurement range. It would be desirable to reduce such torque loads as much as possible. While technologies such as optics eliminate mechanical loading, they introduce new issues such as batteries and other electrical power sources.

There are also known in the art of flow meters generally, a type of pulse generator utilizing magnetically switchable elements. Examples of such pulse generators are shown and described in Onoda et al., U.S. Pat. No. 4,265,127; Bohm et al., U.S. Pat. No. 4,579,008; Jerger et al., U.S. Pat. No. 4,793,192; Merriam, U.S. Pat. No. 5,311,581 and British Patent Specification GB2102129A. Many of these utilize magnetically switchable elements, and a basic pulse generator is disclosed in U.S. Pat. No. 3,780,313.

The prior art does not provide a suitable metering pulse transducer for producing pulses that can be conveniently digitized and transmitted in networks for the collection of metering data. Such transducers should be compact and lightweight, and the prior art devices are not suitable in this respect, because they do not most efficiently utilize the principles of generating and sensing signals using the switchable magnetic elements. Such devices should be easy to manufacture and low in cost, and many of the prior art devices are too expensive to manufacture or not sufficiently desirable for utility metering applications intended for the present invention.

SUMMARY OF THE INVENTION

The invention is embodied in a pulse transducer, which utilizes a compact rotor for carrying a plurality of magnetically switchable elements, and two magnets positioned adjacent the rotor for switching each element four times to produce two pulses in one revolution of a rotor. A compact and efficient sensor is provided for sensing pulses generated by the switching of the magnetically switchable elements as they are moved into and out of the magnetic fields of the two magnets.

The rotor assembly of the present invention provides very little drag and consumes very little torque in mechanical drive mechanisms. The rotor can be used to directly drive a least significant digit analog meter dial, or it may be connected to a meter register drive train to provide digitized electrical signals at the same time as mechanical meter movements are transmitted to a mechanical odometer or a mechanical register dial. The invention can also be embodied in a turbine-type flow meter, and other embodiments.

As compared with the prior art relating to switchable magnetic elements, the present invention is an improvement over devices which include only a single switchable magnetic element, or a magnetic pickup associated with only a single magnetic element. The prior art does not utilize two magnets to produce a switching of each magnetic element four times to produce two pulses in one revolution of a rotor.

The present invention also effectively uses one sensor coil in association with the two magnets and a plurality of switchable magnetic elements in a compact arrangement.

In a preferred embodiment of the invention, the number of switchable magnetic elements is five, so that ten electrical pulses are produced for each revolution of the rotor. This corresponds to a decimal number readout device.

The prior art devices do not generate ten pulses per revolution of a rotor carrying the magnetic elements. Indeed, in many prior art devices, the magnets may be moved instead of the switchable elements. Unless ten pulses are produced per cycle or revolution, mechanical or electrical conversion is required to produce a decimal pulse count.

The invention provides a more compact device than the prior art, making it suitable for use in meter registers which are relatively small instruments.

The invention is disclosed in terms of meter registers for use in measuring water consumption, but may also find application in the metering of utilities such as gas or electricity, and or in other types instrumentation in which it is desired to convert mechanical movement to electrical pulses.

Other objects and advantages will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

DETAILED DESCRIPTION OF THE PREFERRED EMBODIMENTS

Figure 1:
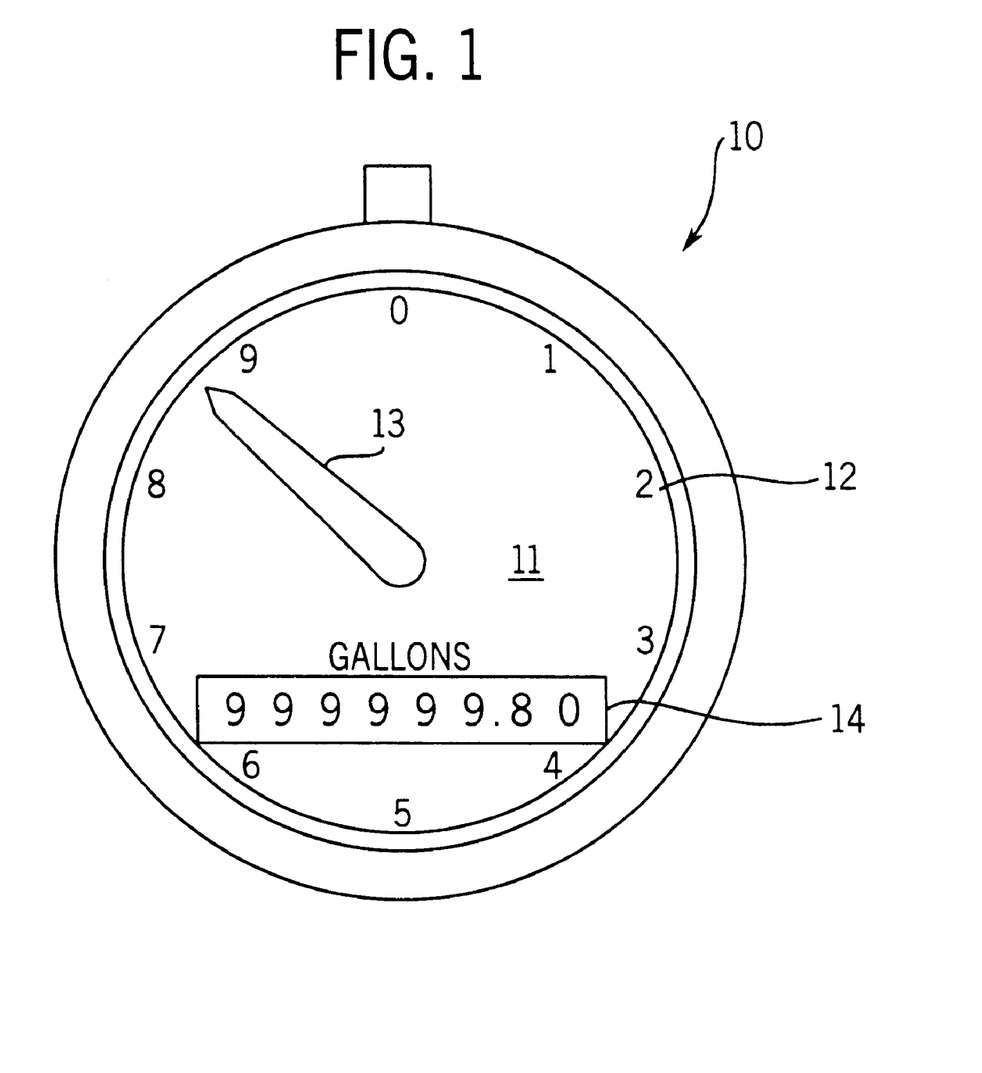
FIG. 1 is a top plan view of a first two embodiments of the present invention.

FIG. 1 illustrates a top plan view of a meter register 10, which incorporates the present invention in two different embodiments shown in FIGS. 3–4 and FIGS. 5–6, respectively. The meter register 10 includes a dial face 11 with decimal numbers 12 arranged in a circle and a dial hand 13 which rotates around a central axis. An odometer 14 is provided by a plurality of number wheels for respective decimal places as illustrated.

Figure 2A:
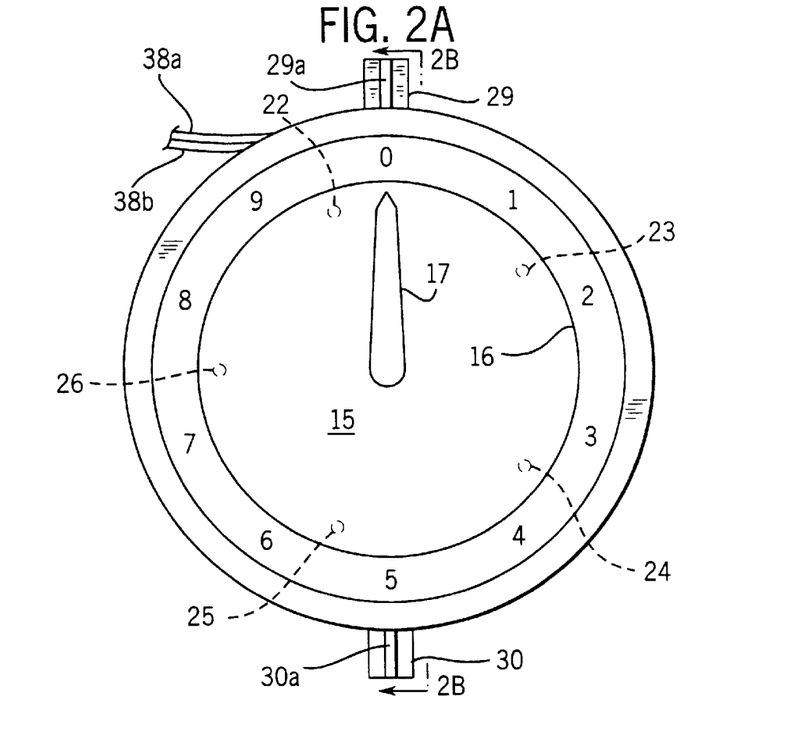
FIG. 2A is a top plan view of a third embodiment of the present invention.
Figure 2B:
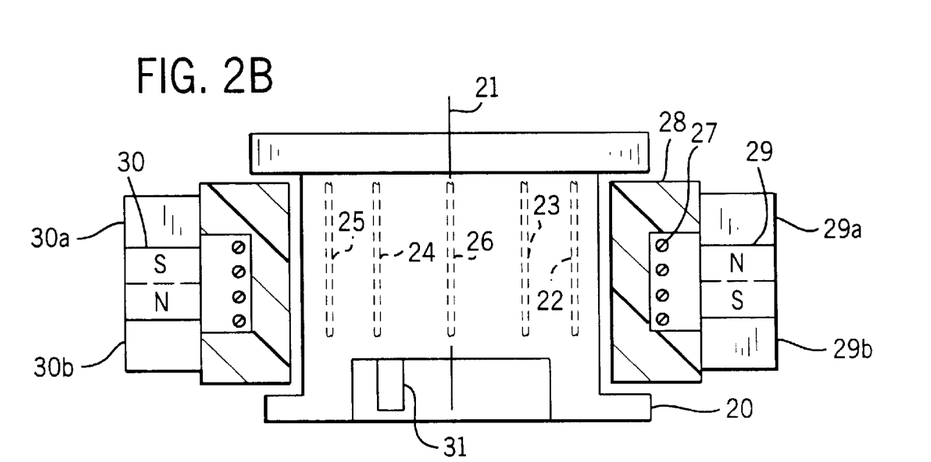
FIG. 2B is a sectional view taken in the plane indicated by line 2B—2B in FIG. 2A.

In certain meter registers, it is possible to include a plurality of such analog dials, such as formed by elements 11, 12 and 13. One such analog dial is illustrated in FIG. 2A, including dial face 15, indicia ring 16 and dial hand 17. A mechanism of the invention is shown in FIG. 2B. Such a mechanism can be connected to a dial hand 17 as shown in FIG. 2A, or it can be connected internally to a gear mechanism in the meter register 10 of FIG. 1, as shown more particularly in FIGS. 3–6. In either type of meter register (FIG. 1 or FIG. 2), the mechanism of the present invention can be coupled to the mechanism for counting the least significant digit of utility consumption.

Referring now to FIG. 2B, the invention is provided by a rotor 20 having an axis of rotation 21 and having a plurality of switchable magnetic elements 22–26 equally and angularly spaced by seventy-two degrees (72°) around the axis of rotation 21 (FIG. 2A). The magnetically switchable elements 22–26 have a north-south polarity in a direction generally parallel to the axis of rotation 21.

The magnetically switchable elements 22–26 are more particularly of a type disclosed in U.S. Pat. No. 4,247,601, in which a wire of Vicalloy alloy is annealed, work hardened and then cut into shorter lengths to provide magnetic elements having a central core formed along its axis and an outer shell disposed around the central core. The shell and the core are made of material in which the magnetic domains can be switched under the influence of a magnetic field. As a result, the magnetic domains in the shell and the core can have the same magnetic polarity or an opposite magnetic polarity, in each of two directions, providing for four possible magnetic states. The wires are each 0.010 inches in diameter and 0.250 inches in length.

A sensor in the form of a coil 27 with 4000 turns of #43 AWG is wound around an annular carrier 28 of synthetic insulating material, sometimes called a "bobbin." As the switchable magnetic elements are switched a pulse will be induced in the coil 27, and from there transmitted through leads 38a, 38b.

Figure 7:
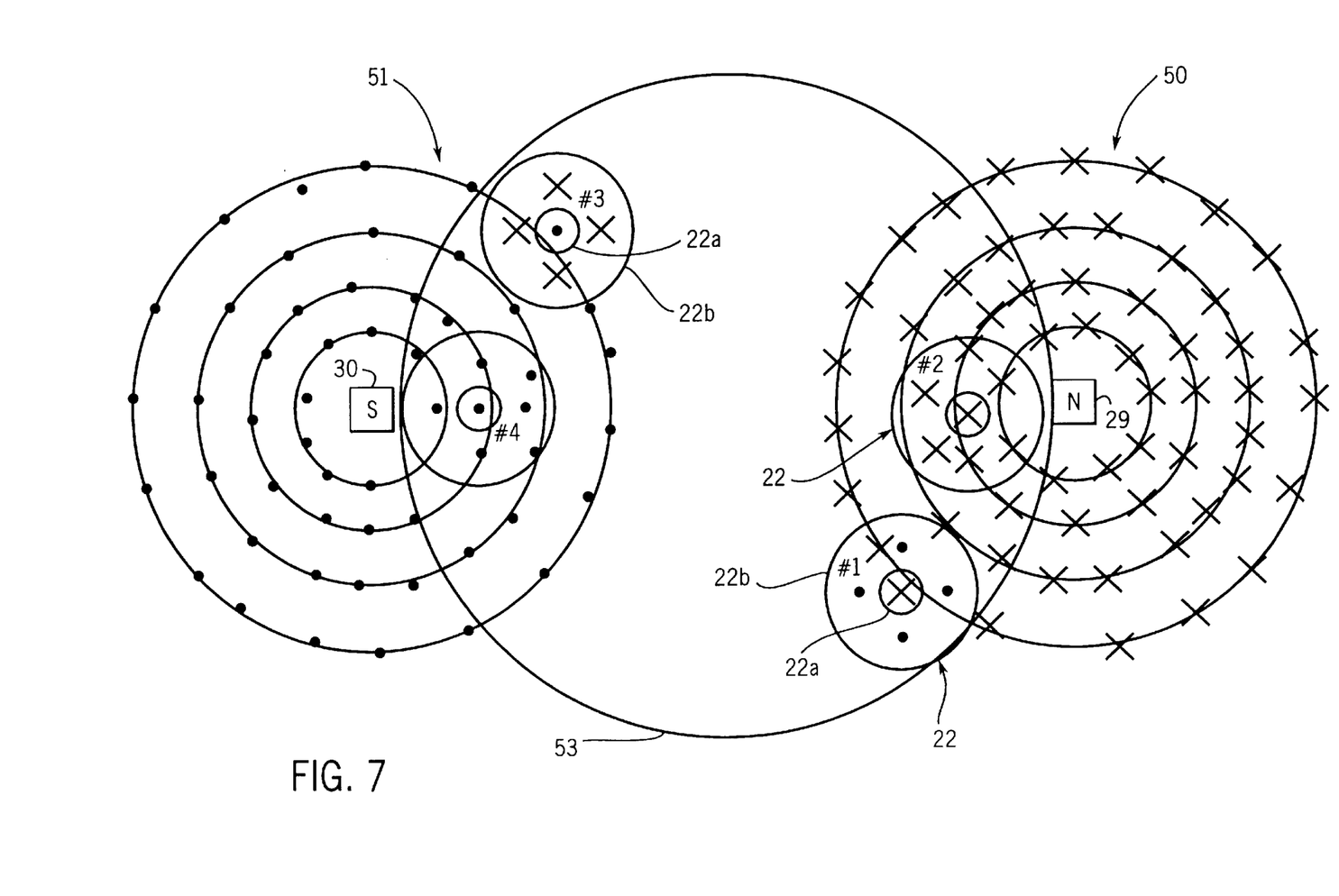
FIG. 7 is a schematic diagram of the operation of the embodiments of FIGS. 1–6.

Two permanent magnets 29, 30 are located adjacent the rotor 20 (FIG. 2B), in diametrically opposite positions in the preferred embodiment, with each having a north (N) pole and a south (S) pole, such that their respective magnetic fields extend laterally to a region occupied by the switchable magnetic elements 22–26 in the rotor 20 (See FIG. 7). The two magnets 29, 30 are operated to switch the magnetic elements 22–26 as they pass by during rotation of the rotor 20.

A first one of the two permanent magnets 29 is disposed generally parallel to the axis of rotation 21 with its north (N) pole and its south pole (S) oriented in a first direction. A second one of the two permanent magnets 30 is disposed generally parallel to the axis of rotation 21 with its north pole (N) and its south pole (S) oriented in an opposite direction from the first one of the two permanent magnets 29. Each of the magnets 29, 30 has soft iron tabs 29a, 29b, and 30a, 30b, respectively, on top and bottom sides, the magnets 29, 30 being made in the form of cubes, and the tabs 29a, 29b, 30a and 30b being of a similar height and length, but of much narrower width than the faces of the cubes. The soft iron tabs 29a, 29b, and 30a, 30b tend to concentrate the flux emanating from the two permanent magnets 29, 30. Although permanent magnets 29, 30 are preferred, it would also be possible to use small electromagnets for elements 29 and 30.

When the rotor 21 is rotated, a plurality of electrical pulses are generated in the coil 27 for each revolution of the rotor 21, the plurality of electrical pulses being twice the number of magnetic elements 22–26 in the rotor 21. The pulses are transmitted through the leads 38a, 38b, seen in FIG. 2A to a circuit seen in FIG. 8.

The rotor 21 has a drive pawl 31 (FIG. 2B) formed in a cavity 32 on an underside to be engaged by various drive mechanisms to be described in relation to FIGS. 3–6.

Figure 3:
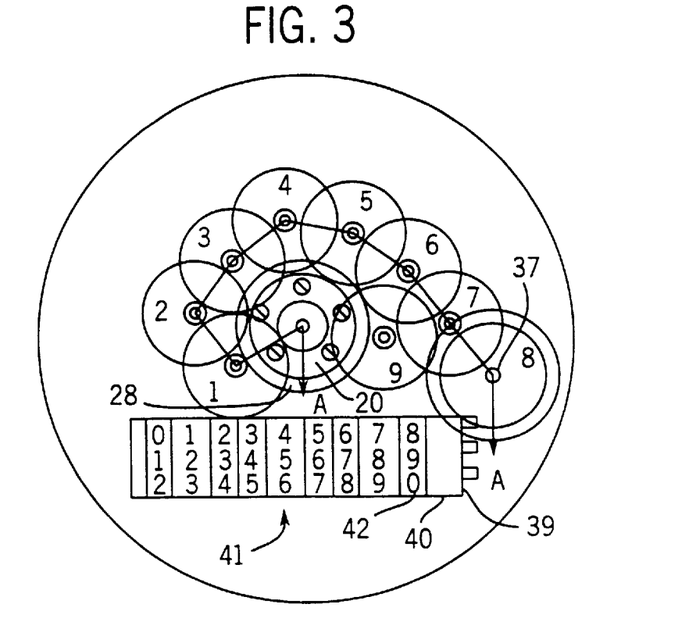
FIG. 3 is a top plan schematic view of a first variation of the embodiment of FIG. 1.
Figure 4:
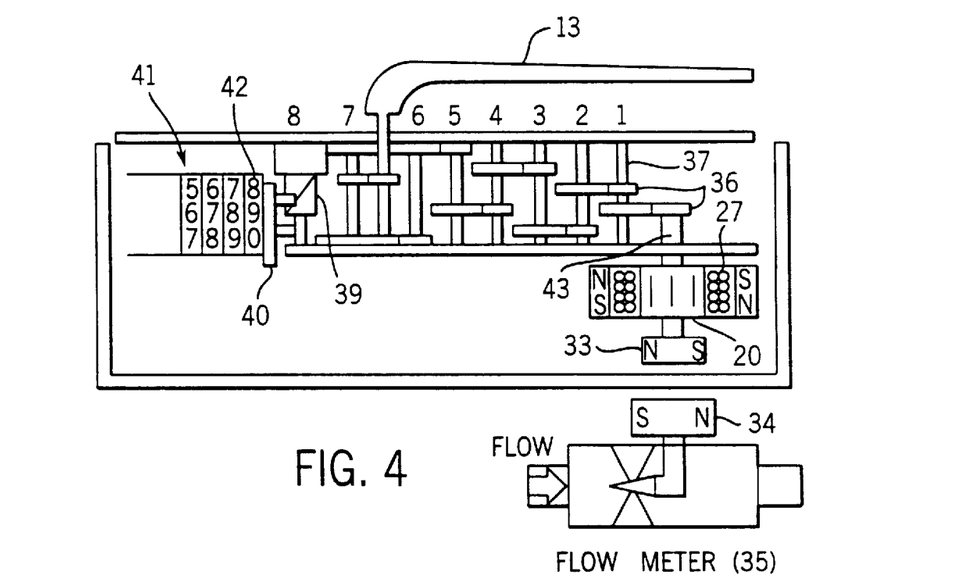
FIG. 4 is a sectional view in elevation of the embodiment of FIG. 3.

FIGS. 3 and 4 show an arrangement, where the rotor 20 of FIG. 2B is driven by a magnetic pickup 33 having north (N) and south (S) poles. The magnetic pickup 33 rotates with a magnetic driver 34 having north (N) and (S) poles, which rotates with operation of a meter movement in a flow meter 35 in response to flow represented by an arrow in FIG. 4. This magnetically coupled mechanical movement is coupled through the magnetic pickup 33 to a series of nine gears 36 mounted on respective gear shafts 37 (numbered "1" to "9") in a gear mechanism, the drive shaft "8" carrying a capstan 39, which drives a toothed wheel 40, which in turn drives the least significant wheel 42 in an odometer 41, formed by a plurality of vertically arranged number wheels 42. The odometer 41 is preferably one of the type described in U.S. Pat. No. 5,376,776, issued Dec. 27, 1994, and assigned to the assignee of the present invention.

A mechanism as described in relation to FIG. 2B is mounted on a rotating shaft 43 to be rotated with magnetic pickup 33. An electrical output signal is taken from the coil 27 and transmitted to electrical circuitry (not shown) to provide electrical pulses commensurate with the mechanical output of the flow meter 35. This electrical output in FIGS. 3–4 is said to be unscaled because it is provided before the gear mechanism translates the raw meter movements to the counts of the odometer 41.

Figure 5:
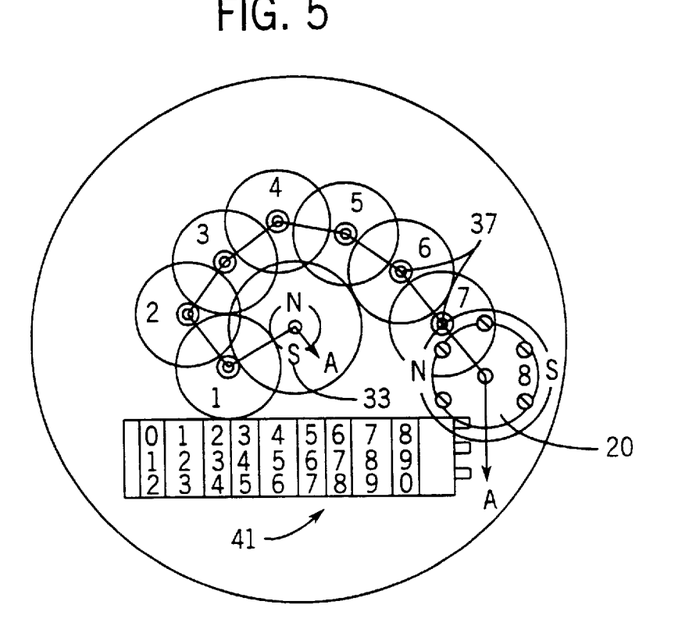
FIG. 5 is a top plan schematic view of a second variation of the embodiment of FIG. 1.
Figure 6:
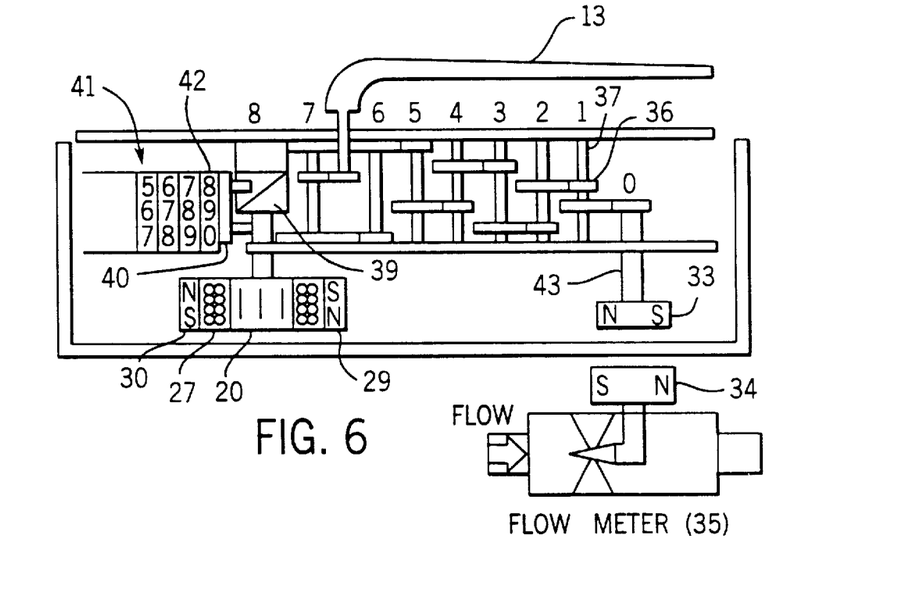
FIG. 6 is a sectional view in elevation of the embodiment of FIG. 5.

FIGS. 5 and 6 show a scaled version of the invention. In the scaled version, a device as shown in FIG. 2B is coupled to the gear shaft 8, which directly drives the capstan 39. This is the high resolution or scaled version because the rotor 20 will be rotated by meter movements through the gear mechanism which drives the odometer 41. The operation of the flow meter 35, the magnetic driver 34 and the magnetic pickup is the same as described in relation to FIG. 4.

An advantage of the present invention is that the assembly of the rotor 20, the coil assembly 27, 28 and the magnets 29, 30 provides very little drag and consumes very little of the torque produced in the mechanical gearing system.

FIG. 7 shows more particularly how the domains in one of the magnetic elements 22 are switched as they are rotated past the magnets 29, 30. The dot represents a direction out of the plane of the drawing, while an "x" represents a direction into the plane of the drawing. In position #1, as the rotor 20 rotates, element 22 travels along path of travel 53 toward the first magnet 29, the domains in the core 22a of the magnetically switchable elements 22–26 (only one of which is shown in FIG. 7) have a polarity represented by an "x", while the domains in the shell 22b have a polarity represented by dots (opposite the polarity of the core) . When the element 22 moves into position #2, in the strongest portion of the H field 50 provided by magnet 29 (N polarity), the domains in the shell 22b will switch to a like polarity with the domains in the core 22a under the strong influence of the H field 50.

The rotor (not shown) will next rotate until the magnetically switchable element 22 reaches position #3, away from the H field 50 of the magnet 29 and an approaching the H field 51 of the S-oriented magnet 30. In position #3, the domains in the core 22a will switch to a polarity opposite the domains 22 in the shell 22b. In position #4, in the strongest portion of H field 51 of the S-oriented magnet 30, the domains in the shell 22b will switch to a direction the same as the direction of the domains in the core 22a, but opposite from the direction of second position, due to the opposite polarity of the magnet 30. When the rotor 20 then rotates back to the position #1, away from the H field 51 of the magnet 30 and approaching the N-oriented magnet 29, the domains in the core 22a will switch polarity to a polarity opposite the domains in the shell 22b.

The four magnetic switching events produce two electrically induced pulses for each magnetic element 22–26 for each revolution of the rotor 20. The switching produces pulses of twenty microseconds at the sensor coil 27. These pulses are transmitted to a pulse conditioning circuit 60 seen in FIG. 8, for translating the pulses into 1-millisecond square wave pulses.

Figure 8:
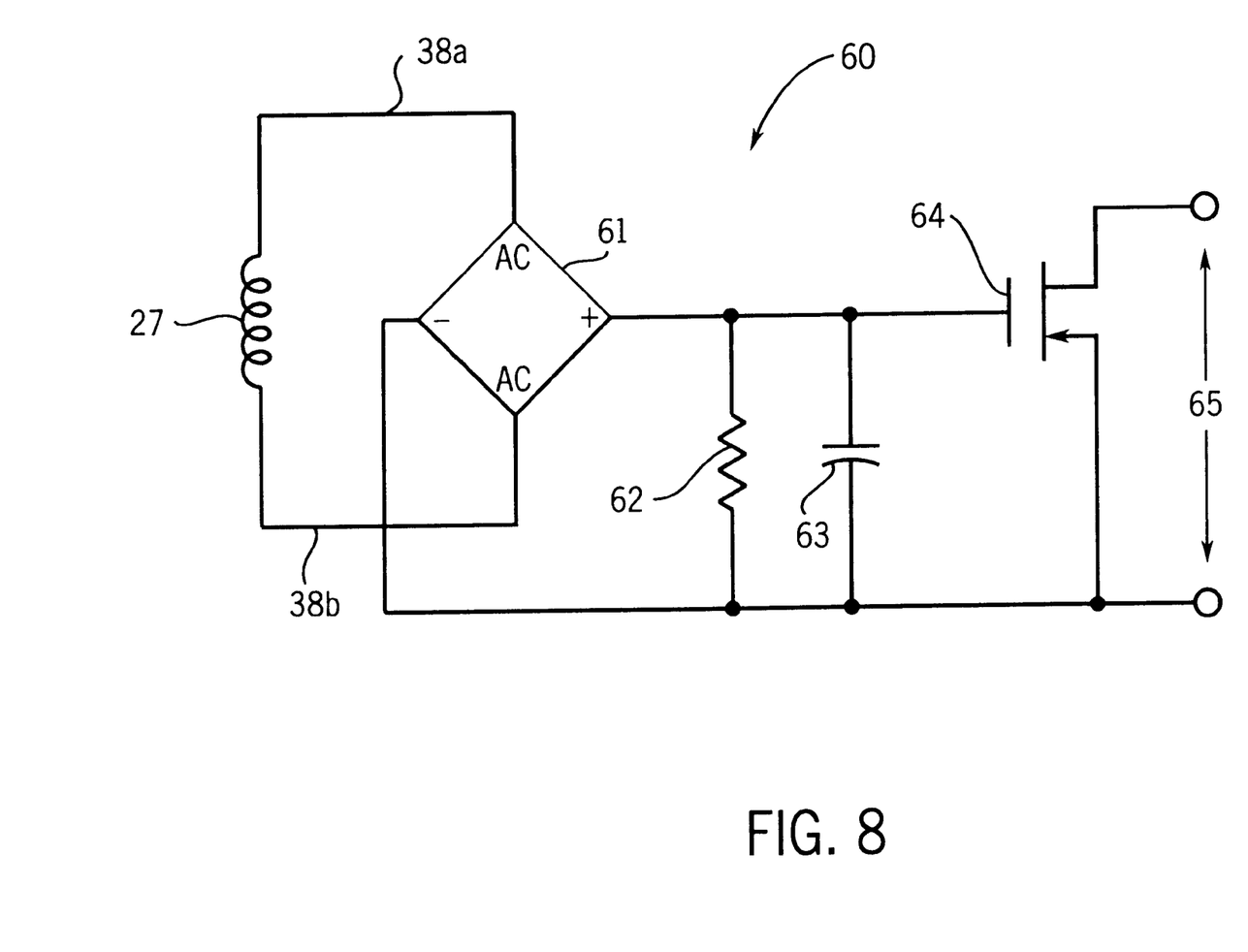
FIG. 8 is a circuit for conditioning pulses from the device of the present invention to output a 1-millisecond pulse.

When the domains of the core are switched under the influence of one of the magnetic fields of magnets 29 and 30, they are switched with a sudden and dramatic effect referred to as an avalanche effect. This induces a relatively significant voltage in the sensor coil 27, on the order of 2 AC volts (0 to peak) and approximately twenty microseconds in pulse width. The pulses will alternate between positive and negative polarity. The coil 27 is electrically connected to a full wave bridge rectifier 61 (FIG. 8). A resistor 62 and a capacitor 63 of suitable values are connected across the output of the rectifier 61, which is also connected to a gate on a N-type FET (field effect transistor) 64. The capacitor 63 is charged by the output of the rectifier 61, and then discharges through the NFET 64 to increase the output pulse width to about one millisecond. The NFET 64 provides an open drain connection 65 to a connecting device, which may be a counter with a display, or may be a data collecting device for retransmitting the data over networks. The assignee of the present invention offers such data collecting and retransmitting devices under the trade designations TRACE®, ACCESSplus® and DIALOG®. Each pulse represents a unit or fractional part of a unit of utility consumption.

Figure 9:
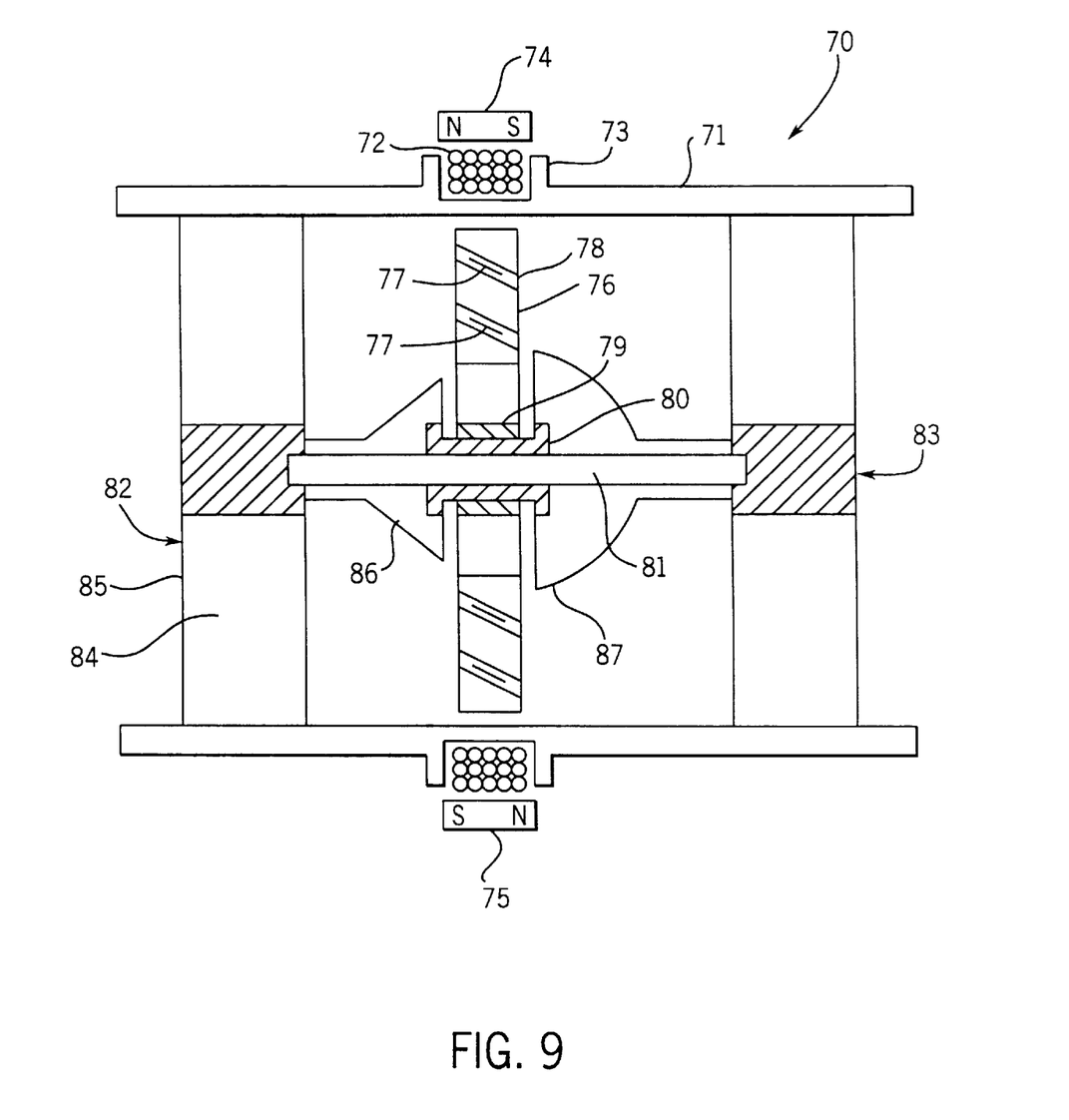
FIG. 9 is a longitudinal section view of a fourth embodiment of the present invention.

Referring to FIG. 9, the invention can also be applied to a turbine-type flow meter 70. This meter 70 is mounted in a section of pipe 71, preferably on the order of one to two inches in diameter, which acts as a meter housing. A sensor coil 72 is disposed around the outside of the pipe or housing 71, in a carrier 73 that may be made integral with pipe 71 may be mounted on the pipe 71. The sensor coil 71 has leads (not shown) connecting it to a circuit as previously described in relation to FIG. 8. A pair of magnets 74 and 75 are disposed diametrically across the pipe 71 to produce the H-fields discussed above.

A turbine-type rotor 76 is mounted in the pipe 71 in the flow stream. The rotor 76 has blades 78 and a number of switchable magnetic elements 77, as described for the other embodiments above, preferably five, are mounted in respective blades 78 for rotation past the magnets 74 and 75. The rotor 76 is mounted by a bushing 79 on a bearing sleeve 80 attached to a shaft 81. The shaft 81 is has its opposite ends mounted in two hangers 82 and 83 which are attached at certain locations to the interior of the pipe 71, but have flow passages 84 between fins 85, so that fluid can flow through the meter. Also shown are an upstream, deflector 86 or hub and a downstream deflector 87 or hub, which are mounted on the shaft 81 and which are typical parts of turbine meters of this type. The flow of fluid through the device causes rotation of the rotor 76, and ten pulses are produced in the coil 72 for each revolution of the rotor 76.

The above description of several detailed embodiments provides several examples of the invention. For a definition of these and other embodiments which come within the scope of the invention reference is made to the claims which follow.

I claim:

1. A pulse transducer, comprising:
   a rotor having an axis of rotation and having a plurality of magnetically switchable elements spaced around the axis and movable along a path of travel around the axis, each of said magnetically switchable elements having at least four magnetic states;
   a sensor disposed adjacent said rotor for carrying magnetically produced electrical pulses;
   two magnets disposed adjacent said sensor to produce magnetic fields of opposite polarity along the path of travel for the plurality of magnetically switchable elements; and
   wherein as said rotor is rotated, said two magnets cause each of said magnetic elements to be magnetically switched through the four magnetic states to produce two electrical pulses in the sensor for each of the magnetic elements for each revolution of the rotor.

2. The pulse transducer of claim 1, wherein the plurality of magnetically switchable elements in the rotor includes five magnetically switchable elements, and wherein ten electrical pulses are produced for one revolution of the rotor.

3. The pulse transducer of claim 2, wherein the plurality of magnetically switchable elements are equally and angularly spaced around the axis of rotation.

4. The pulse transducer of claim 1, wherein each magnetically switchable element in the rotor has a core which is magnetically switchable between two polarity states and a shell which surrounds the core and is magnetically switchable between two polarity states to provide four magnetic states for each magnetically switchable element.

5. The pulse transducer of claim 1, wherein the plurality of magnetically switchable elements are equally and angularly spaced around the axis of rotation.

6. The pulse transducer of claim 1, wherein the two magnets are stationary.

7. The pulse transducer of claim 6, wherein the two magnets are positioned diametrically across the rotor.

8. The pulse transducer of claim 1, wherein the two magnets are positioned diametrically across the rotor.

9. The pulse transducer of claim 1, wherein the sensor includes a coil of wire encircling the rotor.

10. The pulse transducer of claim 9, further comprising a carrier encircling the rotor on which the coil of wire is carried.

11. The pulse transducer of claim 1, wherein the two magnets are permanent magnets.

12. The pulse transducer of claim 1, wherein the rotor is coupled to a dial hand that rotates around a dial face having decimal numbers.

13. The pulse transducer of claim 1, wherein the rotor is coupled to a plurality of odometer number wheel through a drive mechanism.

14. The pulse transducer of claim 1, wherein the rotor of the pulse transducer is driven through a magnetic pickup that is magnetically coupled to rotation of a corresponding magnetic driver in a flow meter.

15. The pulse transducer of claim 14, wherein the rotor is coupled through a gearing arrangement to the magnetic pickup for response to a flow meter, and wherein said gearing arrangement also couples said magnetic pickup to an odometer in a meter register.

* * * * *

UNITED STATES PATENT AND TRADEMARK OFFICE
CERTIFICATE OF CORRECTION

PATENT NO. : 6,502,468 B1 Page 1 of 1
APPLICATION NO. : 09/472105
DATED : January 7, 2003
INVENTOR(S) : Thornborough It is certified that error appears in the above-identified patent and that said Letters Patent is hereby corrected as shown below:

Column 6, Line 19 (claim 1)
"elements spaced around" should be --elements spaced apart and spaced around--

Signed and Sealed this

Eighteenth Day of December, 2007

JON W. DUDAS
*Director of the United States Patent and Trademark Office*